(12) United States Patent
Watanabe

(10) Patent No.: US 8,686,696 B2
(45) Date of Patent: Apr. 1, 2014

(54) DC-DC CONVERTER AND SEMICONDUCTOR DEVICE

(75) Inventor: Kazunori Watanabe, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 387 days.

(21) Appl. No.: 13/215,315

(22) Filed: Aug. 23, 2011

(65) Prior Publication Data

US 2012/0049830 A1   Mar. 1, 2012

(30) Foreign Application Priority Data

Aug. 26, 2010   (JP) .................................. 2010-189490
Apr. 12, 2011   (JP) .................................. 2011-087854

(51) Int. Cl.
G05F 1/10        (2006.01)
G05F 1/40        (2006.01)

(52) U.S. Cl.
USPC .......................................... 323/222; 323/282

(58) Field of Classification Search
USPC ......... 323/222, 225, 233, 268, 271, 282, 293, 323/297
See application file for complete search history.

(56) References Cited

U.S. PATENT DOCUMENTS

| | | | |
|---|---|---|---|
| 6,417,654 B1 * | 7/2002 | Yuguchi et al. | 323/285 |
| 7,372,245 B2 * | 5/2008 | Ito et al. | 323/316 |
| 7,893,670 B2 * | 2/2011 | Pulijala et al. | 323/273 |
| 2007/0216379 A1 | 9/2007 | Kitagawa | |
| 2009/0039858 A1 * | 2/2009 | Hachiya | 323/299 |
| 2009/0201005 A1 | 8/2009 | Noma et al. | |
| 2010/0328010 A1 | 12/2010 | Noma et al. | |
| 2011/0133710 A1 * | 6/2011 | Pancholi et al. | 323/280 |

FOREIGN PATENT DOCUMENTS

| | | |
|---|---|---|
| CN | 101019299 A | 8/2007 |
| EP | 2 106 014 A1 | 9/2009 |
| JP | 58-086868 A | 5/1983 |
| JP | 2006-129630 A | 5/2006 |
| JP | 2009-303313 A | 12/2009 |
| WO | 2006/046731 A1 | 5/2006 |
| WO | 2008/087781 A1 | 7/2008 |

OTHER PUBLICATIONS

International Search Report, PCT Application No. PCT/JP2011/068334, dated Oct. 25, 2011, 2 pages.
Written Opinion, PCT Application No. PCT/JP2011/068334, dated Oct. 25, 2011, 3 pages.

* cited by examiner

*Primary Examiner* — Matthew Nguyen
(74) *Attorney, Agent, or Firm* — Fish & Richardson P.C.

(57) ABSTRACT

A DC-DC converter includes a power conversion portion including a switching element; a first resistor having one terminal electrically connected to the power conversion portion; a second resistor having one terminal electrically connected to the other terminal of the first resistor; a third resistor having one terminal electrically connected to the other terminal of the first resistor; a constant current supply electrically connected to the other terminal of the third resistor; and a control circuit electrically connected to the other terminal of the third resistor and configured to control the switching element. Resistance $R_1$ of the first resistor, resistance $R_2$ of the second resistor, resistance $R_3$ of the third resistor, a reference current $I_{ref}$ output from the constant current supply, and an output voltage $V_{out}$ output from the power conversion portion satisfy a following formula:

$$\left\{\left(1+\frac{R_3}{R_2}\right)\cdot R_1 + R_3\right\}\cdot I_{ref} > -V_{out}.$$

21 Claims, 13 Drawing Sheets

DC-DC CONVERTER AND SEMICONDUCTOR DEVICE

TECHNICAL FIELD

The technical field relates to a DC-DC converter and a semiconductor device.

BACKGROUND ART

Various electronic devices, electric propulsion vehicles, and the like include DC-DC converters (also referred to as DC converter circuits or DC to DC power supplies) that convert a direct current power to another direct current power. For example, DC-DC converters are utilized for generating a constant output voltage or a plurality of output voltages with different values on the basis of voltage with large fluctuation.

As an example of the configuration of a DC-DC converter, Patent Document 1 discloses a non-isolated DC-DC converter including a coil, a diode, and a transistor.

There are various kinds of non-isolated DC-DC converters such as a step-up DC-DC converter, a step-down DC-DC converter, an inverting DC-DC converter, and a step-up and step-down DC-DC converter.

Step-up DC-DC converters convert an inputted direct-current voltage into a direct-current voltage higher than the inputted direct-current voltage and output the higher direct-current voltage. Step-down DC-DC converters convert an inputted direct-current voltage into a direct-current voltage lower than the inputted direct-current voltage and output the lower direct-current voltage. Inverting DC-DC converters have a configuration in which a coil and a diode of a step-up DC-DC converter interchange with each other. The inverting DC-DC converters convert an inputted direct-current voltage into a direct-current voltage with polarity opposite to that of the inputted direct-current voltage and output the direct-current voltage with the opposite polarity.

Patent Document 2 discloses a step-up DC-DC converter, a step-down DC-DC converter, and an inverting DC-DC converter as non-isolated DC-DC converters.

Patent Document 3 discloses an example of the configuration of an inverting DC-DC converter. FIG. 6 illustrates a converter controller 610 and a switching element 606 that are included in an inverting DC-DC converter in Patent Document 3.

In FIG. 6, the converter controller 610 includes a negative-to-positive voltage conversion circuit 601, an error amplifier 603, a pulse width modulation comparator 604, and a buffer transistor 605.

From a feedback voltage output terminal of an inverting DC-DC converter, a feedback voltage (VFB) which is a negative voltage is supplied to a feedback voltage input terminal 607 of the converter controller 610 without any change. In the converter controller 610, the negative-to-positive voltage conversion circuit 601 converts the supplied feedback voltage (VFB) which is a negative voltage into a positive voltage, and an output of the negative-to-positive voltage conversion circuit 601 is input to the error amplifier 603. The error amplifier 603 compares the output of the negative-to-positive voltage conversion circuit 601 to a reference voltage Vref.

REFERENCE

[Patent Document 1] Japanese Published Patent Application No. S58-086868
[Patent Document 2] PCT International Publication No. 2008/087781
[Patent Document 3] Japanese Published Patent Application No. 2009-303313

DISCLOSURE OF INVENTION

In the inverting DC-DC converter in FIG. 6, a feedback voltage is a negative voltage; accordingly, the supplied feedback voltage which is a negative voltage needs to be converted into a positive voltage in the converter controller 610 in order to compare the feedback voltage to a reference potential Vref which is a positive voltage. Therefore, the inverting DC-DC converter in FIG. 6 is provided with the negative-to-positive voltage conversion circuit 601 with which the feedback voltage is converted into a positive voltage. In the case where the feedback voltage which is a negative voltage is converted into a positive voltage in a controller in this manner, the configuration of the controller becomes complex.

Further, as illustrated in FIG. 6, when the controller of an inverting DC-DC converter needs a complex configuration, a controller utilized in a step-up DC-DC converter, a step-down DC-DC converter, or the like cannot be used as the controller of an inverting DC-DC converter.

An object of an embodiment of the present invention is to provide a DC-DC converter that includes a control circuit and has a simple configuration.

An object of an embodiment of the present invention is to provide a DC-DC converter that includes a control circuit having a simple configuration.

An embodiment of the present invention is a DC-DC converter. The DC-DC converter includes a power conversion portion including a switching element, a first resistor, one of terminals of which is electrically connected to the power conversion portion, a second resistor, one of terminals of which is electrically connected to the other of the terminals of the first resistor, a third resistor, one of terminals of which is electrically connected to the other of the terminals of the first resistor, a constant current supply electrically connected to the other of the terminals of the third resistor, and a control circuit electrically connected to the other of the terminals of the third resistor and configured to control the switching element. Resistance $R_1$ of the first resistor, resistance $R_2$ of the second resistor, resistance $R_3$ of the third resistor, a reference current $I_{ref}$ output from the constant current supply, and an output voltage $V_{out}$ output from the power conversion portion satisfy following Formula 1.

$$\left\{\left(1 + \frac{R_3}{R_2}\right) \cdot R_1 + R_3\right\} \cdot I_{ref} > -V_{out} \quad \text{[Formula 1]}$$

The control circuit may include a reference voltage generation circuit and a control signal generation portion.

An embodiment of the present invention is a DC-DC converter. The DC-DC converter includes a power conversion portion including a switching element, a first resistor, one of terminals of which is electrically connected to the power conversion portion, a second resistor, one of terminals of which is electrically connected to the other of the terminals of the first resistor, a third resistor, one of terminals of which is electrically connected to the other of the terminals of the first resistor, and a control circuit electrically connected to the other of the terminals of the third resistor and configured to control the switching element. The control circuit includes a reference current generation circuit. Resistance $R_1$ of the first resistor, resistance $R_2$ of the second resistor, resistance $R_3$ of the third resistor, a reference current $I_{ref}$ generated by the reference current generation circuit, and an output voltage $V_{out}$ output from the power conversion portion satisfy following Formula 2.

$$\left\{\left(1+\frac{R_3}{R_2}\right)\cdot R_1 + R_3\right\}\cdot I_{ref} > -V_{out} \quad \text{[Formula 2]}$$

The power conversion portion may include a coil, a capacitor, and a diode.

The DC-DC converter may be an inverting DC-DC converter or a Cuk DC-DC converter.

An embodiment of the present invention can provide a DC-DC converter that includes a control circuit and has a simple configuration.

An embodiment of the present invention can provide a DC-DC converter that includes a control circuit having a simple configuration.

BEST MODE FOR CARRYING OUT THE INVENTION

Figure 1:
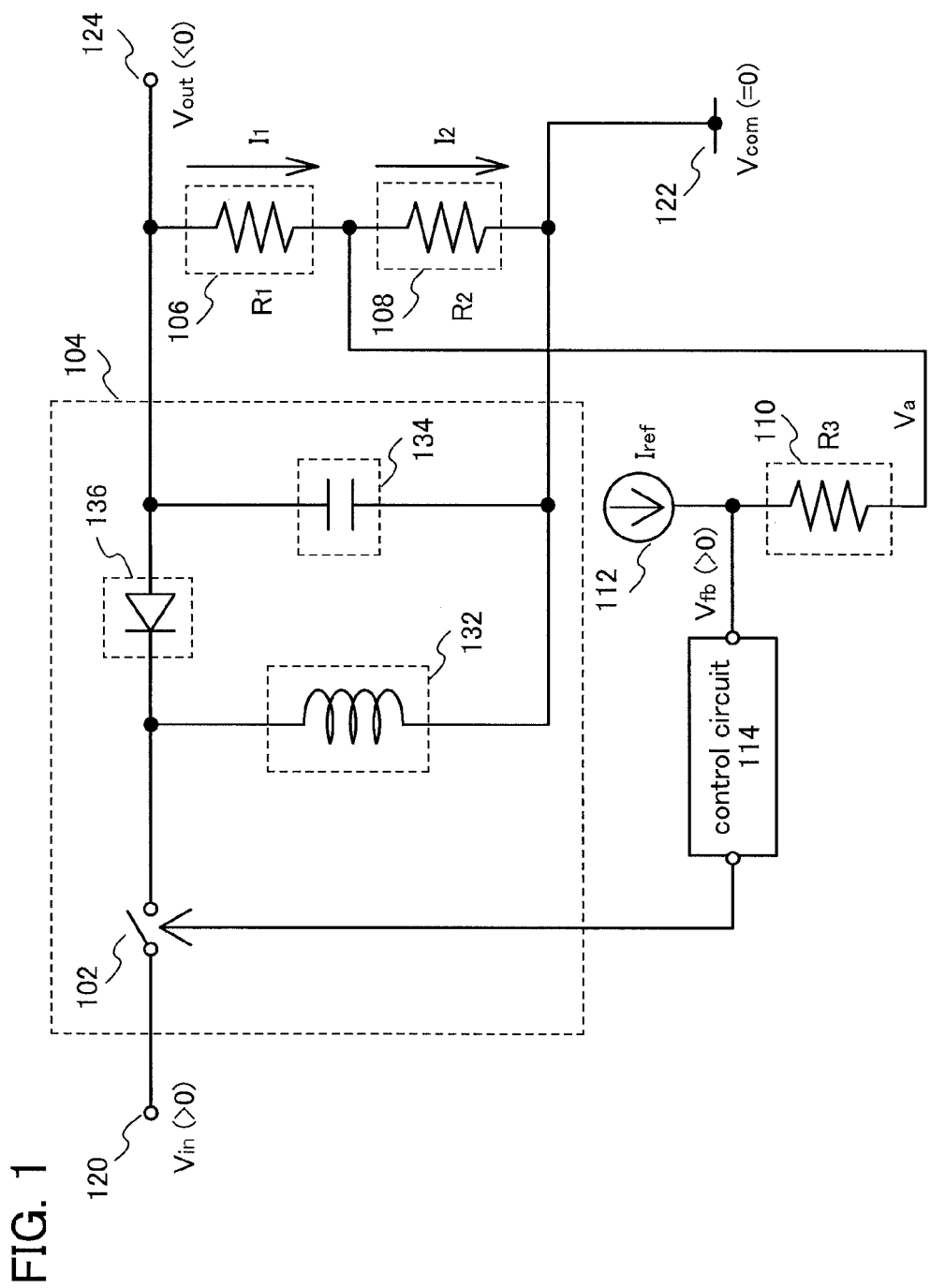
FIG. 1 illustrates an example of the configuration of a DC-DC converter.

Examples of embodiments describing the present invention will be described with reference to the drawings. Note that the present invention is not limited to the following description because it will be easily understood by those skilled in the art that various changes and modifications can be made without departing from the spirit and scope of the present invention. Therefore, the present invention should not be construed as being limited to the following description of the embodiments. In referring to the drawings, in some cases, the same reference numerals are used in common for the same portions in different drawings. Further, in some cases, the same hatching patterns are applied to similar parts, and the similar parts are not necessarily designated by reference numerals in different drawings.

Note that the contents in different embodiments can be combined with one another as appropriate. In addition, the contents of the embodiments can be replaced with each other as appropriate.

Further, in this specification, the term "k (k is a natural number)" is used in order to avoid confusion among components, and the terms do not limit the components numerically.

Note that a difference between potentials at two points (also referred to as a potential difference) is generally referred to as a voltage. However, in an electric circuit, a potential difference between the potential at one point and the potential serving as a reference (also referred to as a reference potential) is used in some cases. Further, in some cases, Volt (V) is used as the units either of voltage and a potential. Thus, in this specification, a potential difference between a potential at one point and the reference potential is sometimes used as a voltage at the point unless otherwise specified.

Note that in this specification, the phrase "A and B are connected to each other" indicates the case where A and B are directly connected to each other, the case where A and B are electrically connected to each other, and the like. Specifically, the description that "A and B are connected to each other" includes cases where A and B are considered to have substantially the same potential in light of circuit operation, e.g., a case where A and B are connected through a switching element such as a transistor and A and B have the potentials substantially the same potential as each other through the conduction of the switching element, a case where A and B are connected through a resistor and a potential difference between potentials generated at both ends of the resistor does not affect operation of a circuit including A and B, and the like.

In this specification, an "on" state of a transistor means a source and a drain thereof are electrically connected, while an "off" state of a transistor means a source and a drain thereof are not electrically connected.

Note that the present invention includes, in its category, all the semiconductor devices in which a DC-DC converter can be used: for example, integrated circuits (e.g., microprocessors and image processing circuits, RFID (radio frequency identification) tags, memory media, solar cells, lighting devices including light-emitting elements, and semiconductor display devices. Further, the semiconductor display devices include semiconductor display devices using DC-DC converters, such as liquid crystal display devices, light-emitting devices in which a light-emitting element typified by an organic light-emitting element (OLED) is provided, electronic paper, digital micromirror devices (DMD), plasma display panels (PDP), field emission displays (FED), and the like, in its category.

Embodiment 1

In this embodiment, an example of the configuration of a DC-DC converter will be described with reference to FIG. 1. FIG. 1 illustrates the configuration of an inverting DC-DC converter as an example of a DC-DC converter.

In FIG. 1, a DC-DC converter includes a power conversion portion 104, a resistor 106 (hereinafter, referred to as a first resistor), a resistor 108 (hereinafter, referred to as a second resistor), a resistor 110 (hereinafter, referred to as a third resistor), a constant current supply 112, and a control circuit 114.

The power conversion portion 104 includes a switching element 102, a coil 132, a capacitor 134, and a diode 136.

A first terminal of the switching element 102 is connected to an input terminal 120, and a second terminal of the switching element 102 is connected to a cathode of the diode 136. The switching element 102 controls connection between the input terminal 120 and the cathode of the diode 136. Specifically, an input voltage $V_{in}$ is input from the input terminal 120 to the DC-DC converter when the switching element 102 is in an on state, and input of the input voltage $V_{in}$ to the DC-DC converter is stopped when the switching element is in an off state.

A semiconductor element having a switching function may be used as the switching element 102. In this embodiment, for example, a transistor is described as the switching element 102. Switching of the transistor can be controlled by a gate-source voltage $V_{gs}$.

One of terminals of the coil 132 is connected to the cathode of the diode 136, and the other of the terminals of the coil 132 is connected to a terminal 122. One of terminals of the capacitor 134 is connected to an output terminal 124 and the other of the terminals of the capacitor 134 is connected to the terminal 122. An anode of the diode 136 is connected to the output terminal 124.

One of terminals of the first resistor 106 is connected to the output terminal 124 and the other of the terminals of the first resistor 106 is connected to one of terminals of the third resistor 110. One of terminals of the second resistor 108 is connected to the one of the terminals of the third resistor 110 and the other of the terminals of the second resistor 108 is connected to the terminal 122. The other of the terminals of the third resistor 110 is connected to the constant current supply 112, and a reference current $I_{ref}$ is input from the constant current supply 112.

The control circuit 114 is connected between the other of the terminals of the third resistor 110 and the constant current supply 112. A feedback voltage $V_{fb}$, is supplied to the control circuit 114. Further, the control circuit 114 controls ON/OFF of the switching element 102 by controlling a gate-source voltage $V_{gs}$.

The input voltage $V_{in}$ is supplied to the input terminal 120 as an input of the DC-DC converter. The input voltage $V_{in}$ is supplied to the output terminal 124 through the power conversion portion 104 as an output voltage $V_{out}$ of the DC-DC converter. A reference potential $V_{com}$ is supplied to the terminal 122.

Note that in this specification, a voltage that has a potential higher than the reference potential $V_{com}$ (a voltage which is positive with respect to the reference potential $V_{com}$) is a positive voltage, and a voltage that has a potential lower than the reference potential $V_{com}$ (a voltage which is negative with respect to the reference potential $V_{com}$) is a negative voltage.

Note that in this specification, the reference potential $V_{com}$ is 0 V. It is only necessary for the reference potential $V_{com}$ to be a reference potential with respect to the input voltage $V_{in}$, the output voltage $V_{out}$, the feedback voltage $V_{fb}$, a reference potential $V_{ref}$ and the like. Accordingly, the reference potential $V_{com}$ may be set at the potential except for 0 V (e.g., GND).

The DC-DC converter in FIG. 1 obtains the feedback voltage $V_{fb}$ on the basis of a voltage generated by division of the output voltage $V_{fb}$ using the resistor 106 and the resistor 108, with the use of the resistor 110 and the constant current supply 112.

Here, the case where the feedback voltage $V_{fb}$ is higher than zero will be described below.

A relation among the feedback voltage $V_{fb}$, the reference current $I_{ref}$ and resistance $R_3$ of the third resistor 110 can be expressed by following Formula 3. In Formula 3, a voltage of a node between the resistor 106 and the resistor 108 is expressed by $V_a$.

$$V_{fb}=V_a+I_{ref}R_3 \quad \text{[Formula 3]}$$

Here, a relation between the voltage $V_a$, and current $I_2$ flowing through the second resistor 108 and resistance $R_2$ of the second resistor 108 can be expressed by following Formula 4.

$$V_a=I_2 \cdot R_2 \quad \text{[Formula 4]}$$

A relation between the current $I_2$ and current $I_1$ flowing through the first resistor 106 can be expressed by following Formula 5. In Formula 5, a reference current that is supplied from the constant current supply 112 to the one of the terminals of the second resistor 108 through the third resistor 110 is expressed by $I_{ref}$.

$$I_2=I_1+I_{ref} \quad \text{[Formula 5]}$$

A voltage (the output voltage $V_{out}$) supplied to the output terminal 124 is expressed by following Formula 6. In Formula 6, resistance of the first resistor 106 is expressed by $R_1$.

$$V_{out}-V_a=I_1 \cdot R_1 \quad \text{[Formula 6]}$$

According to Formulas 3 to 6, the feedback voltage $V_{fb}$ can be expressed by following Formula 7.

$$V_{fb} = \frac{V_{out} + \left\{\left(1+\frac{R_3}{R_2}\right)\cdot R_1 + R_3\right\}\cdot I_{ref}}{\left(1+\frac{R_1}{R_2}\right)} \quad \text{[Formula 7]}$$

Accordingly, the case where the feedback voltage $V_{fb}$ is a positive voltage ($V_{fb}>0$) is expressed by following Formula 8.

$$\left\{\left(1+\frac{R_3}{R_2}\right)\cdot R_1 + R_3\right\}\cdot I_{ref} > -V_{out} \quad \text{[Formula 8]}$$

Therefore, the resistance $R_1$ of the first resistor 106, the resistance $R_2$ of the second resistor 108, the resistance $R_3$ of the third resistor 110, and the reference current $I_{ref}$ are set so as to satisfy Formula 8; accordingly, the feedback voltage which is a positive voltage ($V_{fb}, >0$) can be obtained even when the voltage (the output voltage $V_{out}$) supplied to the output terminal 124 is a negative voltage ($V_{out}<0$).

As described above, the resistance $R_1$ of the first resistor 106, the resistance $R_2$ of the second resistor 108, the resistance $R_3$ of the third resistor 110, and the reference current $I_{ref}$ are set, so that the feedback voltage which is a positive voltage ($V_{fb}>0$) can be obtained. In the control circuit 114, the feedback voltage $V_{fb}$ which is a positive voltage and the reference potential $V_{ref}$ which is a positive voltage are compared so as to control the switching element 102, and thus, the configuration of the control circuit 114 need not to be complex. Accordingly, the configuration of the control circuit 114 can be simple.

Note that as a DC-DC converter which outputs the output voltage $V_{out}$ which is a negative voltage in response to the input voltage $V_{in}$ which is a positive voltage, a Cuk DC-DC converter is given as well as an inverting DC-DC converter. In the above description, an inverting DC-DC converter is described, but this embodiment can be applied to a Cuk DC-DC converter.

Other kinds of DC-DC converters are a step-up DC-DC converter, a step-down DC-DC converter, a single ended primary inductance converter (SEPIC), and the like. These DC-DC converters output the output voltage $V_{out}$ which is a positive voltage in response to the input voltage $V_{in}$ which is a positive voltage. In these DC-DC converters, the feedback voltage $V_{fb}$ supplied to a control circuit is obtained from the output voltage $V_{out}$ which is a positive voltage, and therefore, is a positive voltage.

On the other hand, the inverting DC-DC converter described in this embodiment has a configuration in which the output voltage $V_{out}$ which is a negative voltage is output in response to the input voltage $V_{in}$ which is a positive voltage. The feedback voltage $V_{fb}$, that is generated on the basis of the output voltage $V_{out}$ which is a negative voltage and that is supplied to the control circuit 114 can be a positive voltage. Therefore, a control circuit which is used for a step-up DC-DC converter, a step-down DC-DC converter, or the like can be applied to the inverting DC-DC converter described in this embodiment without any change.

Embodiment 2

In this embodiment, an example of the configuration of a control circuit included in a DC-DC converter will be described with reference to FIG. 2.

Figure 2:
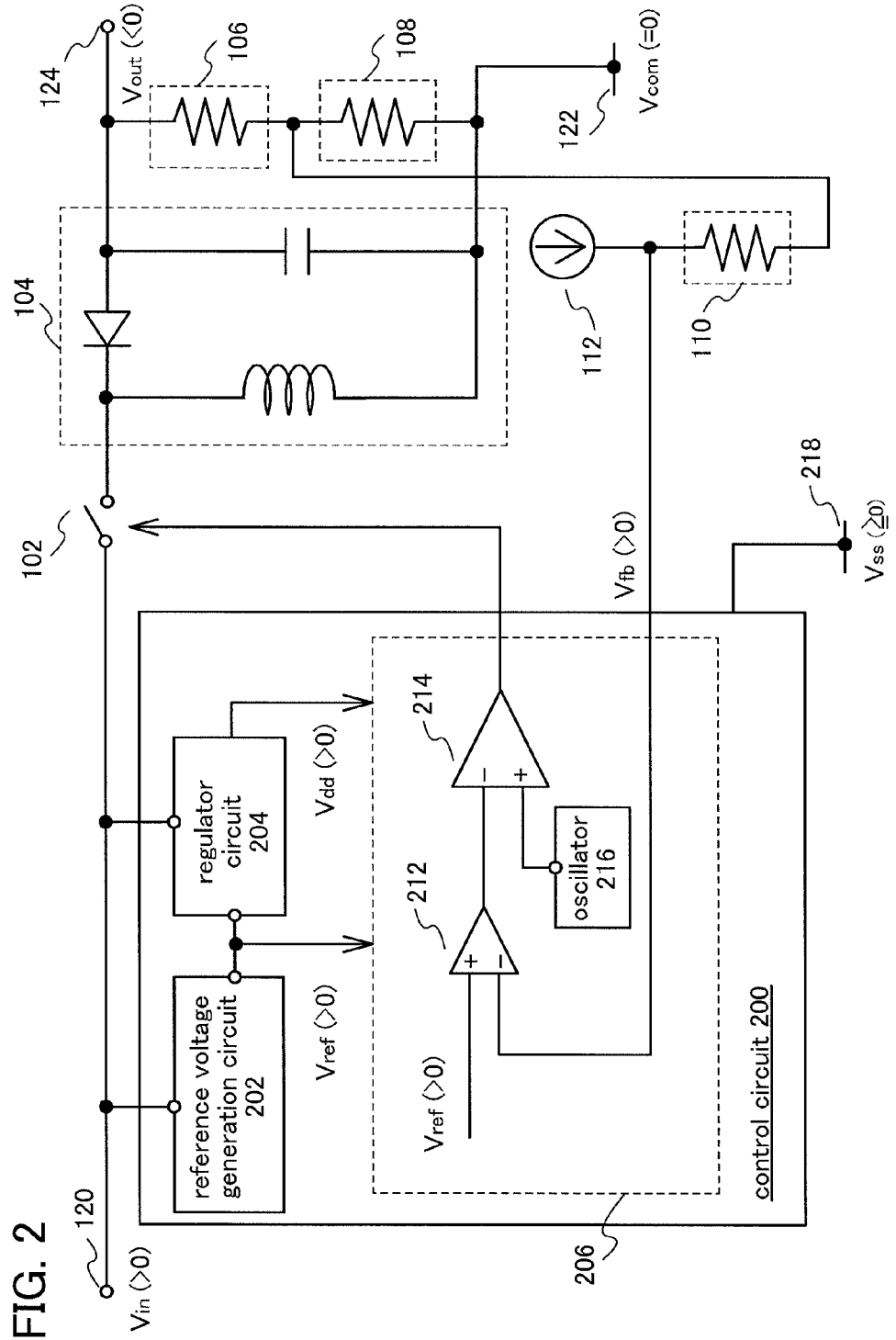
FIG. 2 illustrates an example of the configuration of a control circuit.

In FIG. 2, a control circuit 200 includes a reference voltage generation circuit 202, a regulator circuit 204, and a control signal generation portion 206. The control circuit 200 in FIG. 2 corresponds to the control circuit 114 in FIG. 1.

The control circuit 200 is connected to a terminal 218. A low power supply voltage $V_{ss}$ is supplied from the terminal 218. The control circuit 200 operates with a voltage between the input voltage $V_{in}$ and the low power supply voltage $V_{ss}$. Here, the low power supply voltage $V_{ss}$ satisfies $V_{ss}<V_{dd}$ with respect to a high power supply voltage $V_{dd}$. Note that the low power supply voltage $V_{ss}$ may be set at the reference potential $V_{com}$. In the following description, $V_{ss}$ is 0 V.

The reference voltage generation circuit 202 has a function of generating the reference potential $V_{ref}$. Here, in the case where the input voltage $V_{in}$ is a positive voltage ($V_{in}>0$), the reference potential $V_{ref}$ is a positive voltage ($V_{ref}>0$). Further, a band gap reference circuit, a circuit utilizing a difference among threshold voltages of transistors, or the like can be used as the reference voltage generation circuit 202.

The regulator circuit 204 generates the high power supply voltage $V_{dd}$ on the basis of the supplied reference potential $V_{ref}$ and supplies the high power supply voltage $V_{dd}$ to the control signal generation portion 206.

Figure 5:
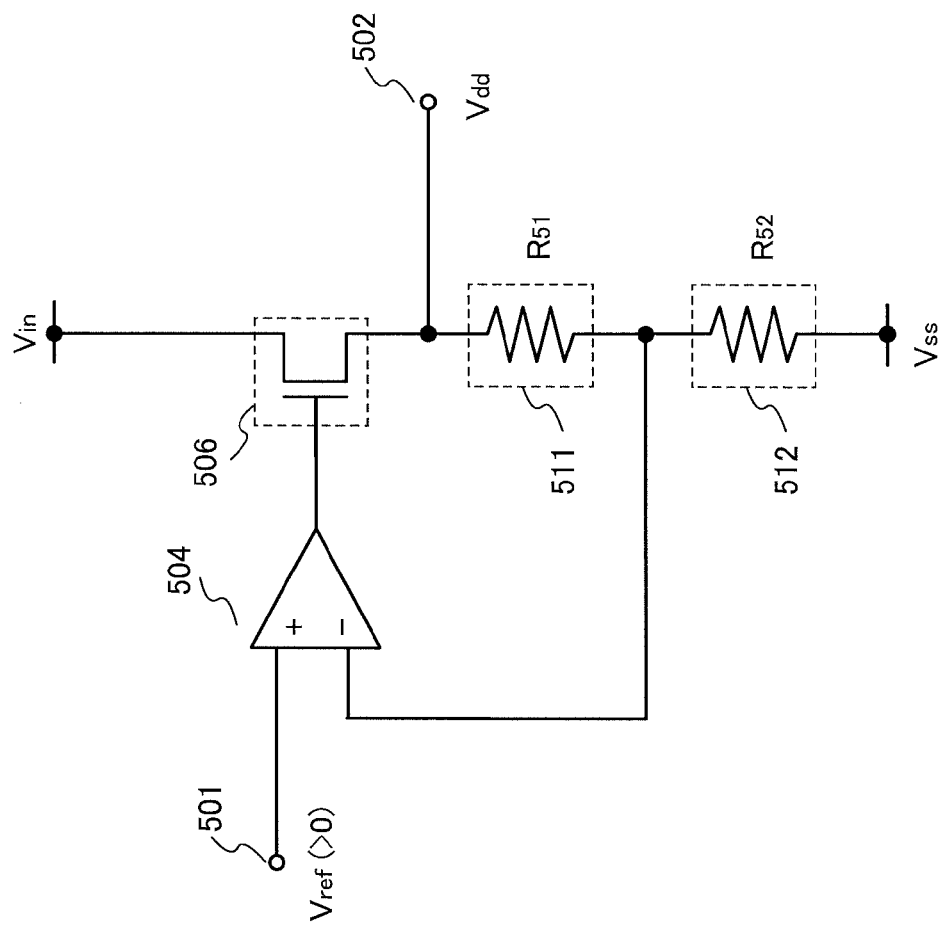
FIG. 5 illustrates an example of the configuration of a regulator circuit.
Figure 6:
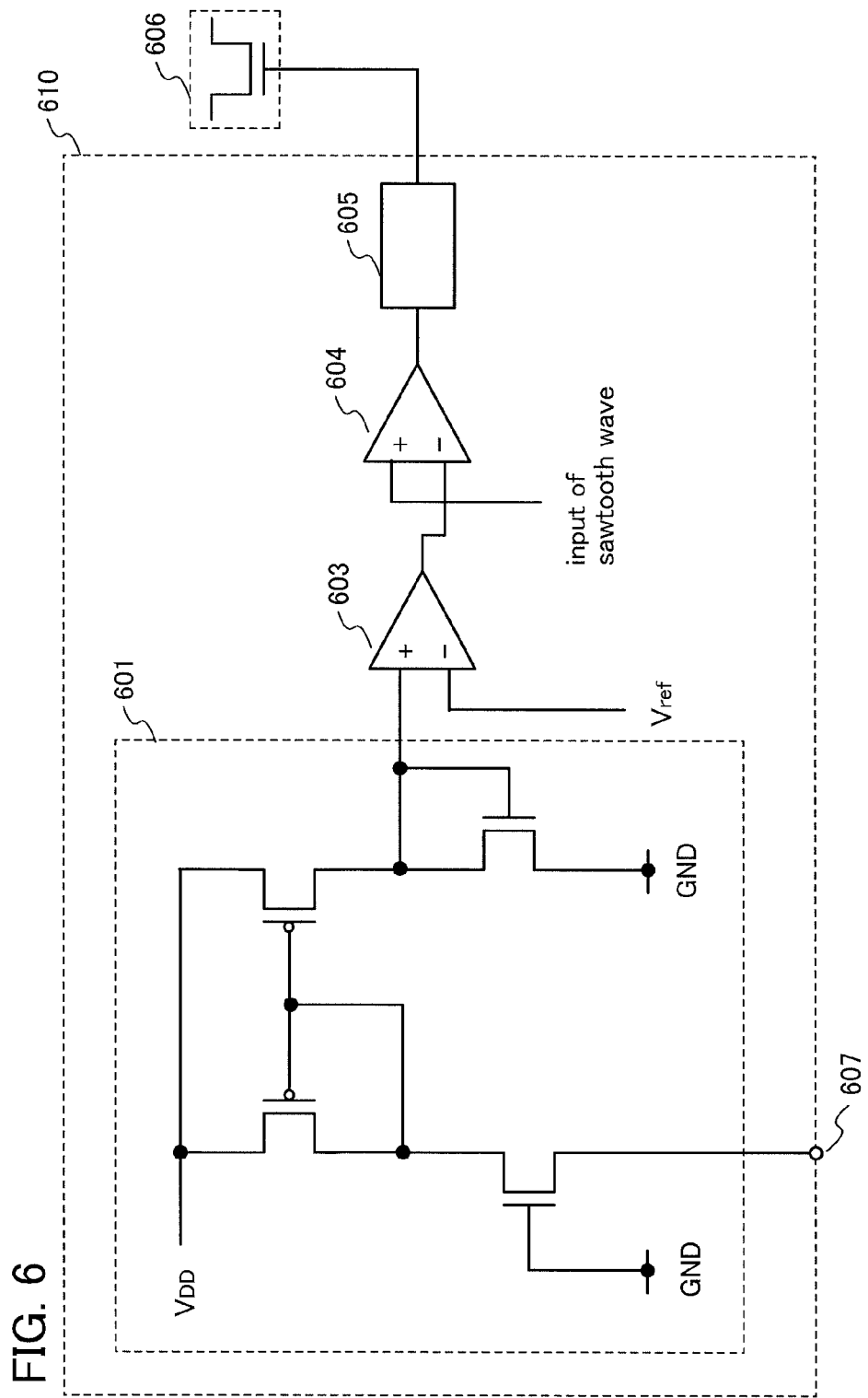
FIG. 6 illustrates an example of the configuration of an inverting DC-DC converter.

FIG. 5 illustrates an example of the configuration of the regulator circuit 204. In FIG. 5, a regulator circuit includes an operational amplifier 504, a transistor 506, a resistor 511, and a resistor 512.

With the regulator circuit in FIG. 5, the high power supply voltage $V_{dd}$ based on following Formula 9 can be obtained. Here, resistance of the resistor 511 is expressed by $R_{51}$ and resistance of the resistor 512 is expressed by $R_{52}$.

$$V_{dd} = \left(1 + \frac{R_{51}}{R_{52}}\right) \cdot V_{ref} \qquad \text{[Formula 9]}$$

In this manner, the regulator circuit in FIG. 5 can generate the high power supply voltage $V_{dd}$ on the basis of the reference potential $V_{ref}$ supplied from a terminal 501 and can output the high power supply voltage $V_{dd}$ from a terminal 502.

Note that the control circuit 200 does not necessarily include the regulator circuit 204, and the input voltage $V_{in}$ may be directly supplied to the control signal generation portion 206 as a power supply.

The control signal generation portion 206 includes an error amplifier 212, an operational amplifier 214, and an oscillator 216.

The error amplifier 212 amplifies a difference between the reference potential $V_{ref}$ and the feedback voltage $V_{fb}$, and inputs a signal of the amplified difference to the operational amplifier 214. The operational amplifier 214 compares the signal of the amplified difference that is input from the error amplifier 212 to a triangular wave (a sawtooth waveform) that is input from the oscillator 216, adjusts a duty ratio in accordance with a comparison result, and generates a pulse width modulation (PWM) signal. The switching element 102 is controlled by a pulse width modulation signal that is output from the operational amplifier 214.

Embodiment 3

In this embodiment, an example of the configuration of a circuit which generates the reference current $I_{ref}$ and which is provided in a DC-DC converter will be described.

In FIG. 1 described in Embodiment 1, the control circuit 114 and the constant current supply 112 that generates the reference current $I_{ref}$ are separately provided. On the other hand, a circuit which generates the reference current $I_{ref}$ can be provided in the control circuit 114, instead of the constant current supply 112.

In this embodiment, an example of the configuration of a circuit which generates the reference current $I_{ref}$ and which is provided in the control circuit 114 will be described with reference to FIG. 3.

Figure 3:
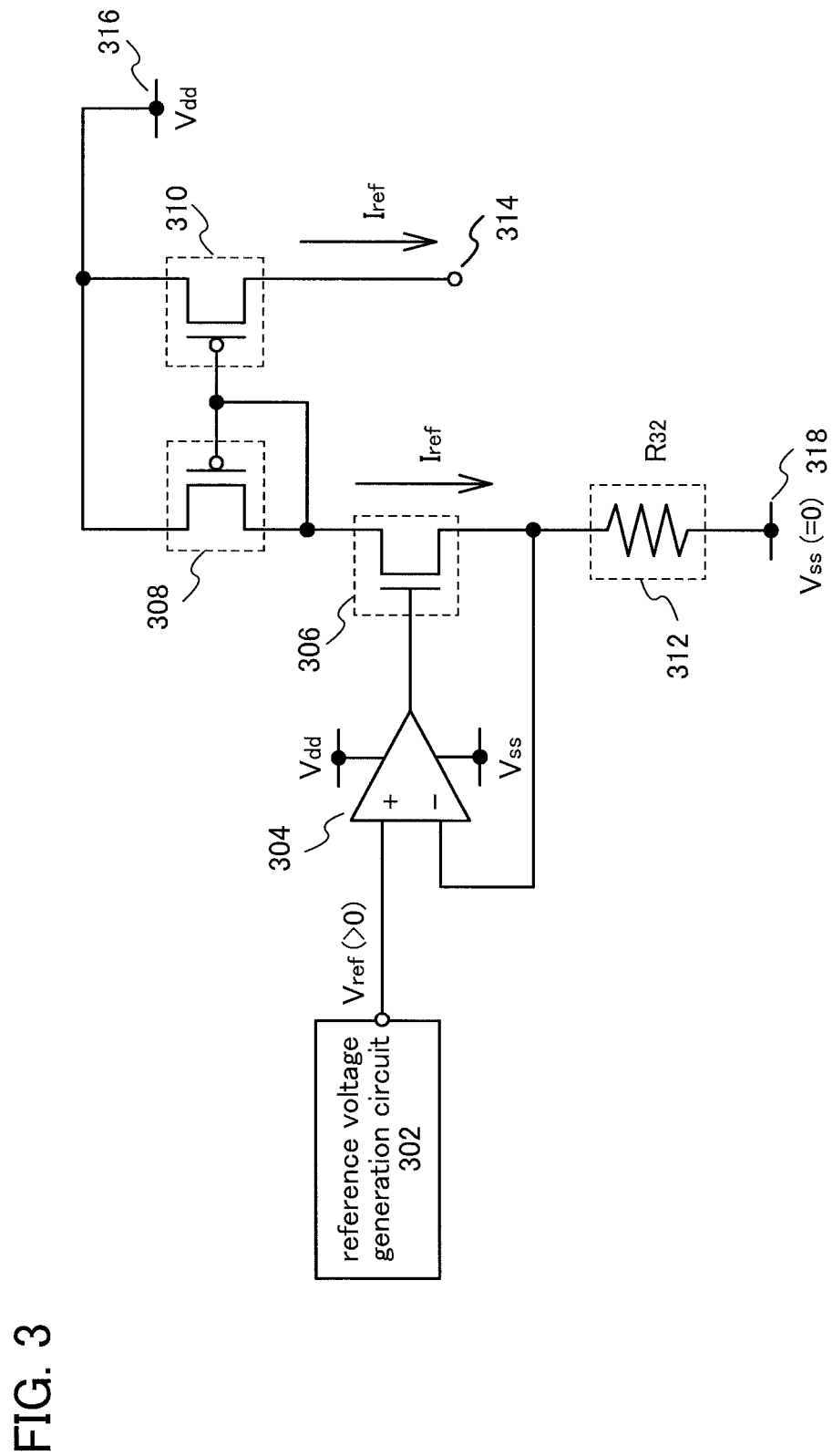
FIG. 3 illustrates an example of the configuration of a circuit which generates a reference current.

FIG. 3 illustrates an example of the configuration of the circuit that generates the reference current $I_{ref}$ (hereinafter, referred to as a reference current generation circuit). The reference current generation circuit includes a reference voltage generation circuit 302, an amplifier 304, a transistor 306, a transistor 308, a transistor 310, and a resistor 312. A high power supply voltage $V_{dd}$ is supplied from a terminal 316. A low power supply voltage $V_{ss}$, is supplied from a terminal 318.

The reference voltage generation circuit 302 has a function of generating the reference potential $V_{ref}$. Here, the reference potential $V_{ref}$ is a positive voltage ($V_{ref}>0$). Further, a band gap reference circuit, a circuit utilizing a difference among threshold voltages of transistors, or the like can be used as the reference voltage generation circuit 302.

With the reference current generation circuit in FIG. 3, the reference current $I_{ref}$ based on following Formula 10 can be obtained. Here, resistance of the resistor 312 is expressed by $R_{32}$.

$$I_{ref} = \frac{V_{ref}}{R_{32}} \qquad \text{[Formula 10]}$$

In this manner, the circuit in FIG. 3 which generates the reference current $I_{ref}$ can generate the reference current $I_{ref}$ on the basis of the reference potential $V_{ref}$ and can output the reference current $I_{ref}$ from a terminal 314.

As the reference voltage generation circuit 302 in FIG. 3, the reference voltage generation circuit 202 provided in the control circuit 200 described in Embodiment 2 can be utilized. That is to say, the reference potential $V_{ref}$ generated in a reference voltage generation circuit can be used for the control signal generation portion 206 in FIG. 2 and the amplifier 304 of the reference current generation circuit in FIG. 3.

Accordingly, the constant current supply 112 that generates the reference current $I_{ref}$ can be omitted, so that the configuration of a DC-DC converter can be simple and the DC-DC converter can be miniaturized.

The circuit in FIG. 3 which generates the reference current $I_{ref}$ can be incorporated in the control circuit 200. Thus, the configuration of the DC-DC converter can be simple and the DC-DC converter can be miniaturized.

Embodiment 4

In this embodiment, an example of the configuration of a reference voltage generation circuit will be described with reference to FIG. 4. The configuration can be applied to the reference voltage generation circuit 202 described in Embodiment 2 and the reference voltage generation circuit 302 described in Embodiment 3.

As an example of the configuration of a reference voltage generation circuit, a reference voltage generation circuit that generates a reference voltage by utilizing a band gap of a PIN diode will be described with reference to FIG. 4. Note that the circuit is also referred to as a band gap reference circuit.

Figure 4:
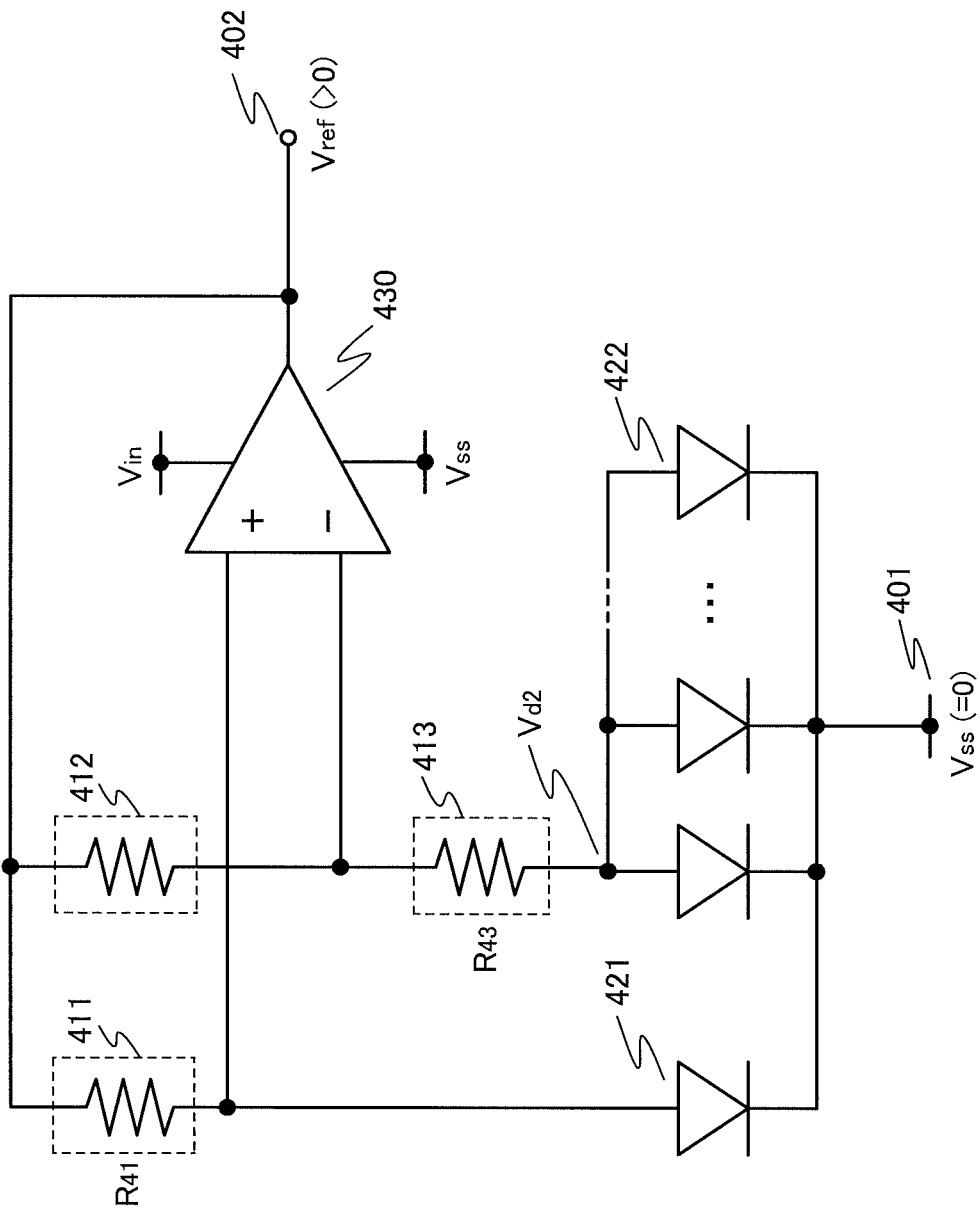
FIG. 4 illustrates an example of the configuration of a reference voltage generation circuit.

In FIG. 4, the band gap reference circuit includes a resistor 411, a resistor 412, a resistor 413, a PIN diode 421, n (n is a natural number) PIN diodes 422 connected in parallel, and an operational amplifier 430.

With the band gap reference circuit in FIG. 4, the reference potential $V_{ref}$ based on following Formula 11 can be obtained. Here, resistance of the resistor 411 is expressed by $R_{41}$, resistance of the resistor 413 is expressed by $R_{43}$, the thermal voltage of the PIN diode 422 is expressed by kT/q (k: Boltzmann's constant, q: elementary charge, T: absolute temperature), and a forward voltage of the PIN diode 422 is expressed by $V_{d2}$. The resistance of the resistor 412 is equal to the resistance of the resistor 411.

$$V_{ref} = \left(1 + \frac{R_{41}}{R_{43}}\right) \cdot \frac{kT}{q} \ln(n) + V_{d2} \qquad \text{[Formula 11]}$$

In this manner, the band gap reference circuit in FIG. 4 can generate the reference potential $V_{ref}$, and can output the reference potential $V_{ref}$ from a terminal 402.

Embodiment 5

The DC-DC converter described in the above embodiment can be used for various electronic devices. For example, the DC-DC converter can be used for cameras such as digital cameras or video cameras, mobile phones, personal digital assistants, e-book terminals, portable game machines, digital photo frames, audio reproducing devices, and the like.

Examples of an electronic device using the DC-DC converter described in the above embodiment will be described with reference to FIGS. 7A to 7D.

Figure 7A:
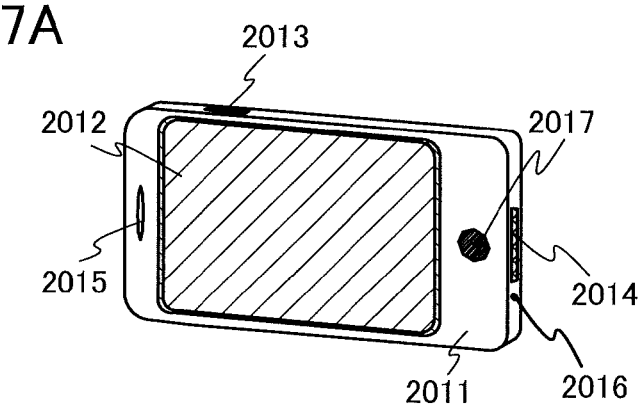
FIGS. 7A to 7D illustrate examples of electronic devices.

FIG. 7A illustrates an example of a mobile phone. In the mobile phone, a display portion 2012 is incorporated in a housing 2011. The housing 2011 may include an operation key 2013, an external connection port 2014, a speaker 2015, a microphone 2016, an operation key 2017, and the like.

The DC-DC converter described in the above embodiment can be used for an integrated circuit which drives a mobile phone. By using the DC-DC converter described in the above embodiment for the integrated circuit, a mobile phone which has an integrated circuit with a simple configuration can be provided.

Figure 7B:
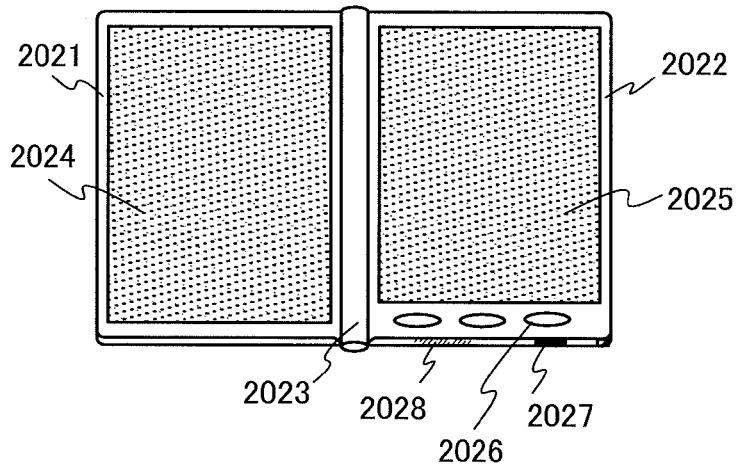

FIG. 7B illustrates an example of an e-book terminal. The e-book terminal includes two housings of a first housing 2021 and a second housing 2022, which are combined with each other by a hinge 2023. The first housing 2021 and the second housing 2022 are connected by the hinge 2023 and can be opened and closed along the hinge 2023. A first display portion 2024 is incorporated in the first housing 2021. A second display portion 2025 is incorporated in the second housing 2022. The second housing 2022 may include an operation key 2026, a power switch 2027, a speaker 2028, and the like.

The DC-DC converter described in the above embodiment can be used for an integrated circuit which drives an e-book terminal. By using the DC-DC converter described in the above embodiment for the integrated circuit, an e-book terminal which has an integrated circuit with a simple configuration can be provided.

Figure 7C:
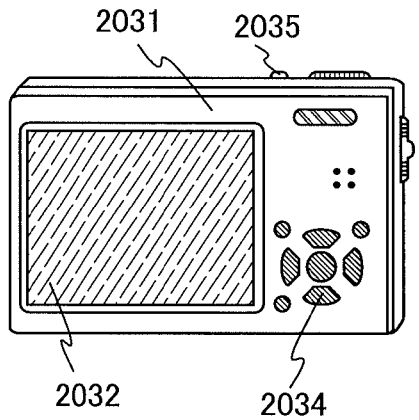
Figure 7D:
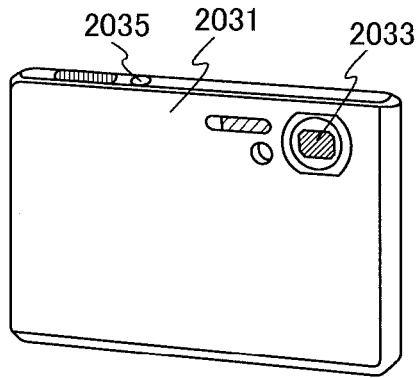

FIGS. 7C and 7D illustrate an example of a digital camera. Note that FIG. 7D illustrates a rear side of the digital camera illustrated in FIG. 7C. In the digital camera, a display portion 2032 is incorporated in a housing 2031. The housing 2031 includes a lens 2033. The housing 2031 may include an operation key 2034, an operation key 2035, and the like. Further, the digital camera may have an antenna and may make the display portion 2032 serve as a display medium of a television receiver or the like by receiving signals such as an image signal and an audio signal in the antenna.

The DC-DC converter described in the above embodiment can be used for an integrated circuit which drives a digital camera. By using the DC-DC converter described in the above embodiment for the integrated circuit, a digital camera which has an integrated circuit with a simple configuration can be provided.

The DC-DC converter described in the above embodiment can be used for various electric propulsion vehicles. For example, the DC-DC converter can be used for electric cars, hybrid vehicles, train vehicles, maintenance vehicles, carts, wheelchairs, electric bicycles, or the like.

Examples of an electric propulsion vehicle using the DC-DC converter described in the above embodiment will be described with reference to FIGS. 8A and 8B.

Figure 8A:
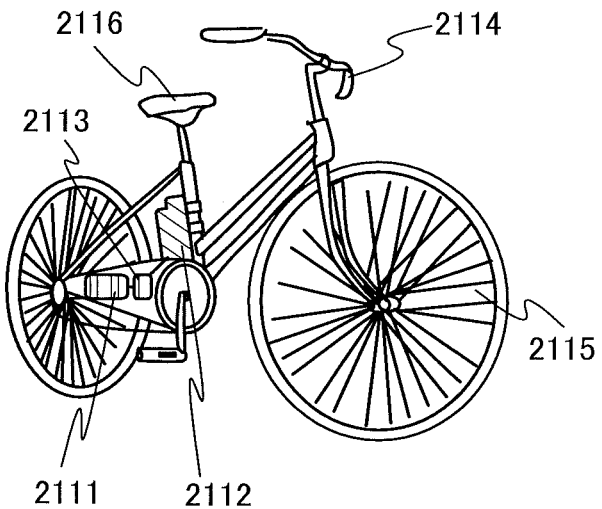
FIGS. 8A and 8B illustrate examples of electric propulsion vehicles.

FIG. 8A illustrates an example of an electric bicycle. The electric bicycle obtains power when current flows through a motor unit 2111. An electric bicycle includes a battery 2112 to which current flowing to the motor unit 2111 is supplied, a power conversion circuit 2113, a handle 2114, a wheel 2115, a saddle 2116, and the like. Although FIG. 8A not illustrate a means for charge the battery 2112, an electric generator or the like may be provided as the means for charging the battery 2112. Further, although a pedal is illustrated in FIG. 8A, the pedal is not necessarily provided.

The DC-DC converter described in the above embodiment can be used for the power conversion circuit 2113. By using the DC-DC converter described in the above embodiment for the power conversion circuit 2113, an electric bicycle which has a power conversion circuit with a simple configuration can be provided.

Figure 8B:
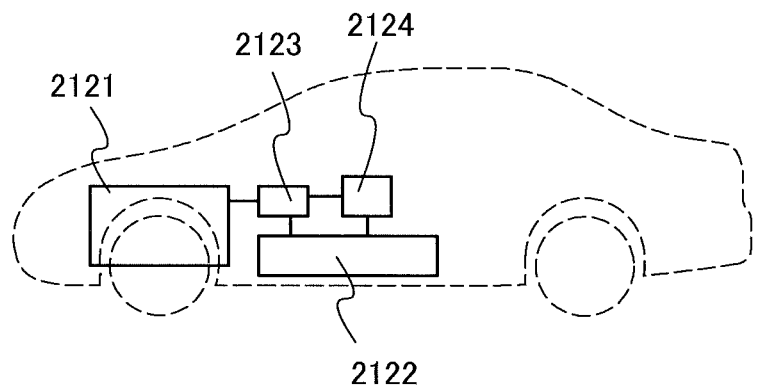

FIG. 8B illustrates an example of an electric car. The electric car obtains power when current flows through a motor unit 2121. An electric car includes a battery 2122 to which current flowing to the motor unit 2121 is supplied, a power conversion circuit 2123, a control circuit 2124 which controls the battery 2122 or the power conversion circuit 2123, and the like. Although FIG. 8B not illustrate a means for charge the battery 2122, an electric generator or the like may be provided as the means for charging the battery 2122.

The DC-DC converter described in the above embodiment can be used for the power conversion circuit 2123. By using the DC-DC converter described in the above embodiment for the power conversion circuit 2123, an electric car which has a power conversion circuit with a simple configuration can be provided.

The DC-DC converter described in the above embodiment can be used for various lighting devices. For example, the DC-DC converter can be used for a lighting device including a light-emitting diode (LED) element or an electroluminescent (EL) element. Examples of a lighting device are a desk lamp, an indoor lighting device, a vehicle light, and the like. A lighting device may be a lighting device with a lighting portion having a curved surface, a flexible lighting device, or the like.

The configuration of a lighting device using the DC-DC converter described in the above embodiment will be described with reference to FIG. 12.

Figure 12:
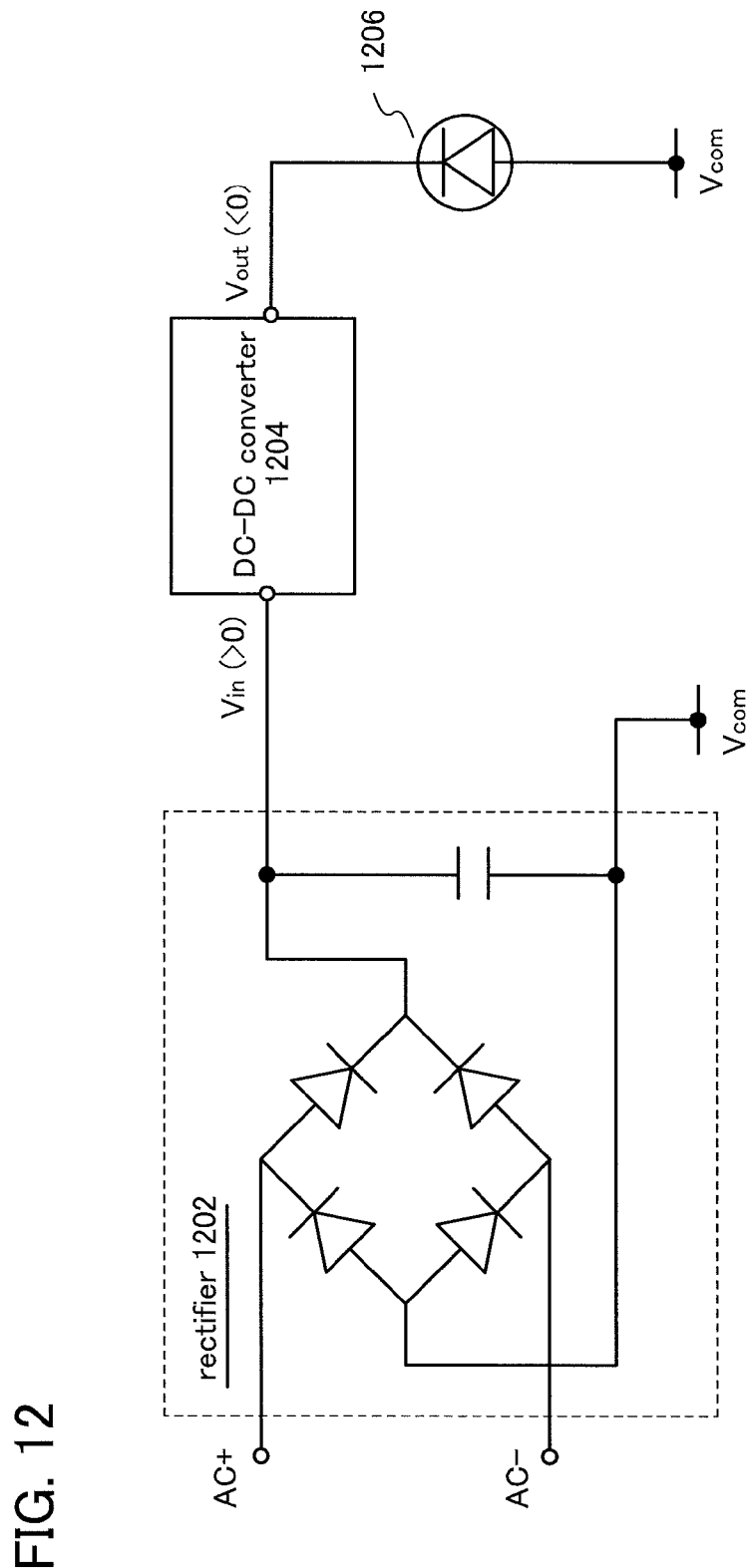
FIG. 12 illustrates an example of the configuration of a lighting device.

FIG. 12 illustrates an example of the configuration of a lighting device. In FIG. 12, an alternating-current voltage (e.g., an alternating-current voltage of 100 V) which is input from an AC power supply is converted into a direct-current voltage in a rectifier 1202 and is input to a DC-DC converter 1204 as the input voltage $V_{in}$. The DC-DC converter 1204 converts the input voltage $V_{in}$, and outputs the output voltage $V_{out}$. The output voltage $V_{out}$ is supplied to one of terminals (e.g., a cathode) of a light-emitting element 1206 from the DC-DC converter 1204. The reference potential $V_{com}$ is supplied to the other of the terminals (e.g., an anode) of the light-emitting element 1206.

Note that the rectifier 1202 includes four rectification elements in FIG. 12, but the configuration of the rectifier 1202 is not limited thereto. Further, as the light-emitting element 1206, a LED element or an EL element can be used. Moreover, as the DC-DC converter 1204, the DC-DC converter described in the above embodiment can be used.

Next, an example in which a Cuk DC-DC converter is used as the DC-DC converter 1204 described in FIG. 12 will be explained with reference to FIG. 13.

Figure 13:
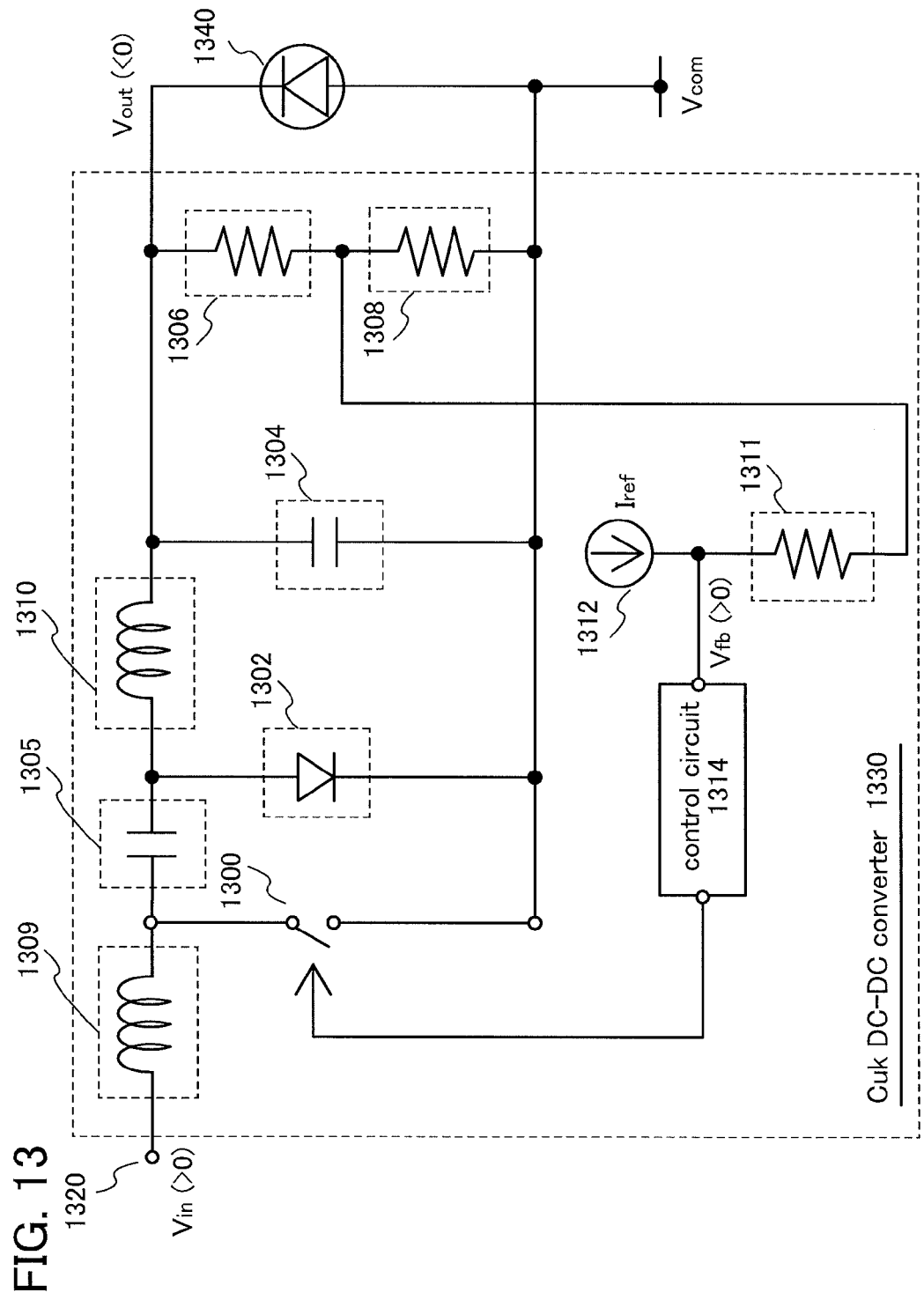
FIG. 13 illustrates an example of the configuration of a Cuk DC-DC converter used for a lighting device.

FIG. 13 illustrates an example of the configuration of a Cuk DC-DC converter used for a lighting device. In FIG. 13, a Cuk DC-DC converter 1330 includes a switching element 1300, a diode 1302, a capacitor 1304, a capacitor 1305, a resistor 1306, a resistor 1308, a coil 1309, a coil 1310, a resistor 1311, a constant current supply 1312, and a control circuit 1314.

The output voltage $V_{out}$ is supplied to one of the terminals (e.g., a cathode) of a light-emitting element 1340 from the Cuk DC-DC converter 1330. The reference potential $V_{com}$ is supplied to the other of the terminals (e.g., an anode) of the light-emitting element 1340.

In the Cuk DC-DC converter 1330, an input terminal 1320 and the light-emitting element 1340 are separated by the capacitor 1305. With such a configuration, elements on the side of the input terminal 1320 can be protected even when a defect in which the anode and the cathode of the light-emitting element 1340 are short-circuited, or the like occurs.

Then, examples of a lighting device using the DC-DC converter described in the above embodiment is described with reference to FIGS. 10A and 10B and FIG. 11.

Figure 10A:
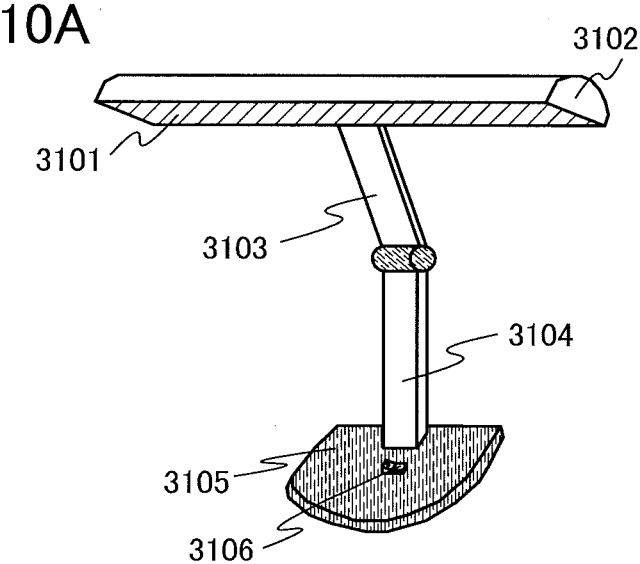
FIGS. 10A and 10B each illustrate an example of a lighting device.

FIG. 10A illustrates an example of a desk lamp. The desk lamp in FIG. 10A includes a lighting portion 3101, a shade 3102, an adjustable arm 3103, a support 3104, a base 3105, a switch 3106, and the like. The lighting portion 3101 is provided with a light-emitting device. The DC-DC converter described in the above embodiment can be used for a circuit which controls the light-emitting device or a driver circuit which drives the desk lamp. By using the DC-DC converter described in the above embodiment for these circuits, a desk lamp with a simple circuit configuration can be provided.

Figure 10B:
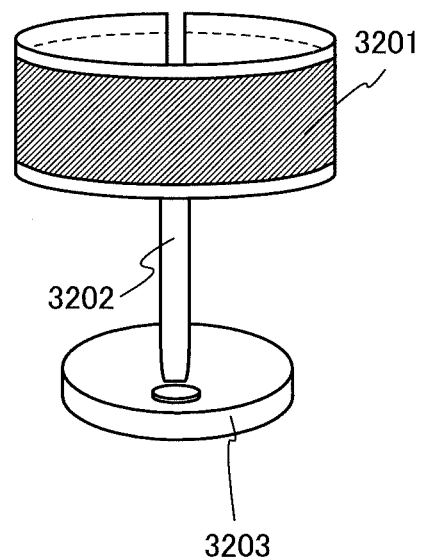

FIG. 10B illustrates another example of a desk lamp as an example of a lighting device including a lighting portion having a curved surface. The desk lamp in FIG. 10B includes a lighting portion 3201, a support 3202, a supporting base 3203, and the like. The lighting portion 3201 is provided with a light-emitting device. Further, the lighting portion 3201 can have a curved surface. Note that although in FIG. 10B, a rolled lighting portion is used as the lighting portion 3201, a shape of the lighting portion 3201 is not limited thereto. By using a lighting portion having a curved surface, the lighting device can be designed more freely. The DC-DC converter described in the above embodiment can be used for a circuit which controls the light-emitting device or a driver circuit which drives the desk lamp. By using the DC-DC converter described in the above embodiment for these circuits, a desk lamp with a simple circuit configuration can be provided.

Note that in FIG. 10B, the desk lamp includes a lighting portion having a curved surface, but this embodiment is not limited thereto. A lighting portion having a curved surface can be used for various lighting devices. Thus, a lighting device which has a simple circuit configuration and which is provided in a lighting portion having a curved surface can be provided.

In addition, the DC-DC converter described in the above embodiment can be used for a flexible lighting device. In this case, the lighting device can be designed more freely. Further, a flexible lighting device can be provided over an object having a curved surface and an object having a complex form; accordingly, the lighting device can be used more widely. For example, in the case where a flexible lighting device is a lighting device of a vehicle (e.g., a car), the lighting device can be provided for a ceiling, a dashboard, a windshield, and the like. Thus, a flexible lighting device having a simple circuit configuration can be provided.

Figure 11:
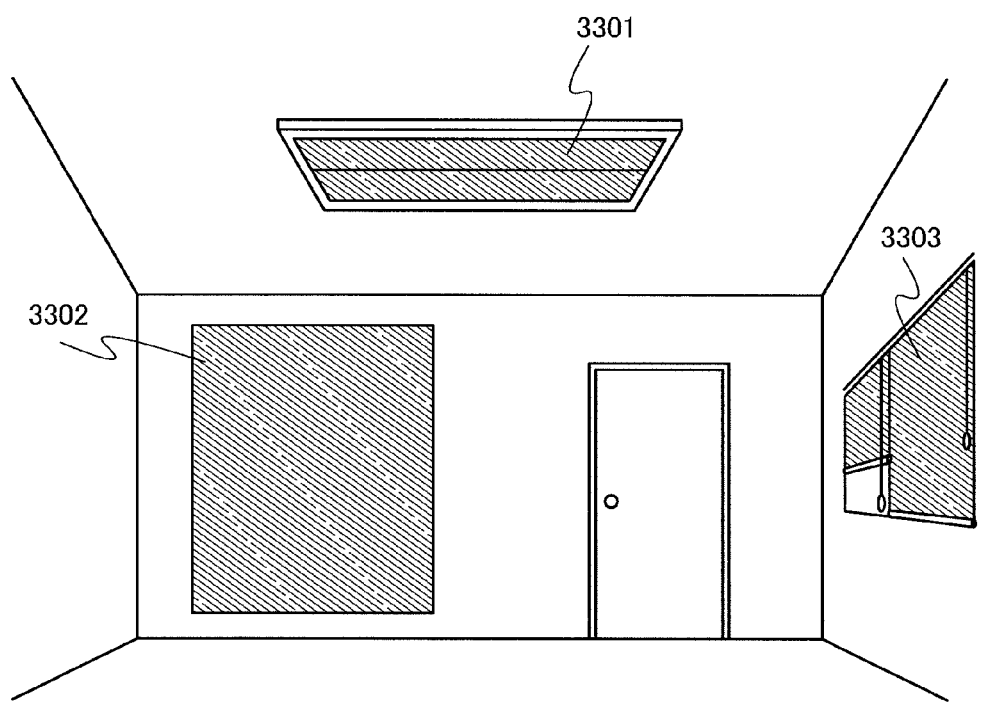
FIG. 11 illustrates examples of lighting devices.

FIG. 11 illustrates an example of an indoor lighting device. In FIG. 11, a lighting device 3301 is provided on a ceiling, and a lighting device 3302 is provided on (installed on or embedded in) a wall. Further, a rolled lighting device 3303 is provided. The DC-DC converter described in the above embodiment can be used for a circuit which controls the light-emitting device included in the lighting device or a driver circuit which drives the lighting device. By using the DC-DC converter described in the above embodiment for these circuits, an indoor lighting device having a simple circuit configuration can be provided.

Example 1

In this example, the result of measuring the feedback voltage $V_{fb}$ which is a positive voltage obtained on the basis of the output voltage $V_{out}$ which is a negative voltage is illustrated.

Figure 9:
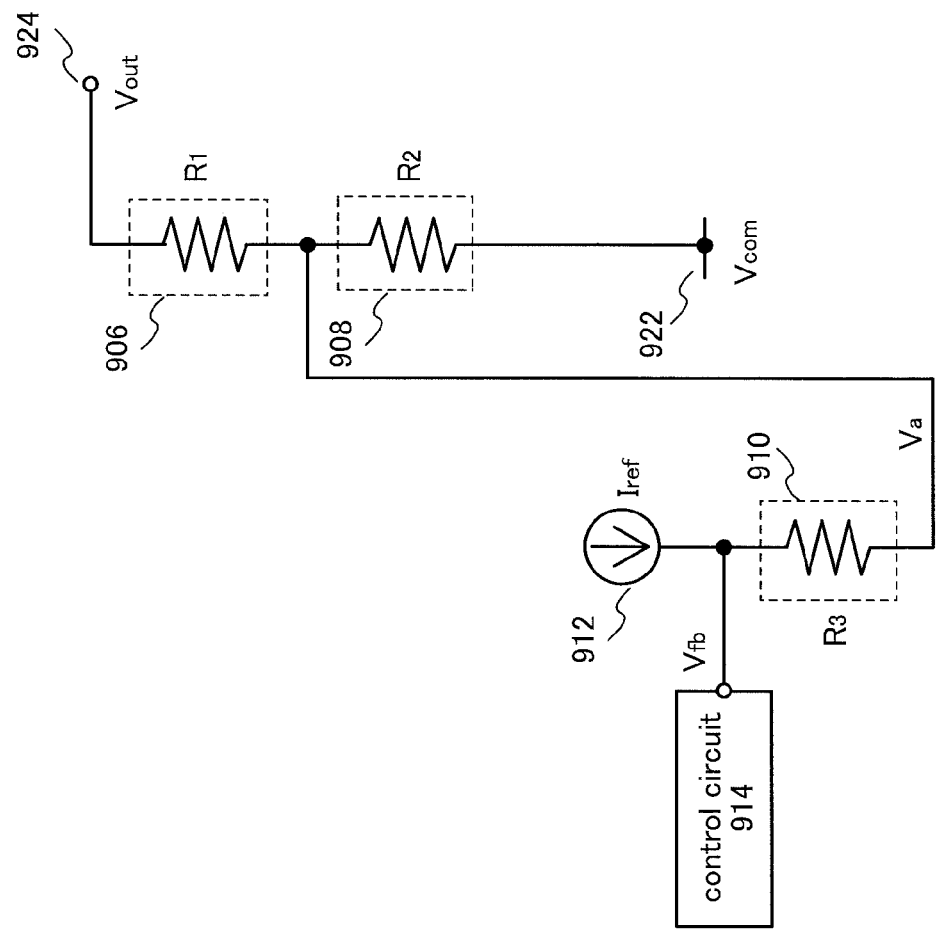
FIG. 9 illustrates a circuit configuration.

FIG. 9 illustrates a circuit configuration used in this example. The circuit configuration in FIG. 9 corresponds to part of a DC-DC converter.

In this example, as illustrated in FIG. 9, a resistor 906 (hereinafter, referred to as a first resistor), a resistor 908 (hereinafter, referred to as a second resistor), a resistor 910 (hereinafter, referred to as a third resistor), a constant current supply 912, and a control circuit 914 are used for a circuit configuration.

One of terminals of the first resistor 906 was connected to an output terminal 924 and the other of the terminals of the first resistor 906 was connected to one of terminals of the third resistor 910. One of terminals of the second resistor 908 was connected to the one of the terminals of the third resistor 910 and the other of the terminals of the second resistor 908 was connected to a terminal 922. The other of the terminals of the third resistor 910 was connected to the constant current supply 912, and a reference current $I_{ref}$ was input from the constant current supply 912.

The control circuit 914 was connected between the other of the terminals of the third resistor 910 and the constant current supply 912. A feedback voltage V was supplied to the control circuit 914.

Here, resistance $R_1$ of the first resistor 906 was set at 100 kΩ, resistance $R_2$ of the second resistor 908 was set at 1 kΩ, the reference current $I_{ref}$ input from the constant current supply 912 was set at 2 μA, and the reference potential $V_{com}$, supplied to the terminal 922 was set at 0 V.

Table 1 shows result of measuring the following values with changing resistance $R_3$ of the third resistor 910: the output voltage $V_{out}$ output from the output terminal 924, the voltage $V_a$ of a node between the resistor 906 and the resistor 908, and the feedback voltage $V_{fb}$.

TABLE 1

| $R_3$ [kΩ] | $V_{out}$ [V] | $V_a$ [V] | $V_{fb}$ [V] |
| --- | --- | --- | --- |
| 883 | −12.9 | −0.123 | 1.63 |
| 862 | −8.9 | −0.087 | 1.59 |
| 838 | −4.8 | −0.046 | 1.55 |

As shown in Table 1, it is confirmed that the feedback voltage $V_f$, which is a positive voltage can be obtained on the basis of the output voltage $V_{out}$ which is a negative voltage.

EXPLANATION OF REFERENCE

102: switching element; 104: power conversion portion; 106: resistor; 108: resistor; 110: resistor; 112: constant current supply; 114: control circuit; 120: input terminal; 122: terminal; 124: output terminal; 132: coil; 134: capacitor; 136: diode; 200: control circuit; 202: reference voltage generation circuit; 204: regulator circuit; 206: control signal generation portion; 212: error amplifier; 214: operational amplifier; 216: oscillator; 218: terminal; 302: reference voltage generation circuit; 304: amplifier; 306: transistor; 308: transistor; 310: transistor; 312: resistor; 314: terminal; 316: terminal; 318: terminal; 401: terminal; 402: terminal; 411: resistor; 412: resistor; 413: resistor; 421: PIN diode; 422: PIN diode; 430: operational amplifier; 501: terminal; 502: terminal; 504: operational amplifier; 506: transistor; 511: resistor; 512: resistor; 601: negative-to-positive voltage conversion circuit; 603: error amplifier; 604: pulse width modulation comparator; 605: buffer transistor; 606: switching element; 607: feedback voltage input terminal; 610: converter controller; 906: resistor; 908: resistor; 910: resistor; 912: constant current supply; 914: control circuit; 922: terminal; 924: output terminal; 1202: rectifier; 1204: DC-DC converter; 1206: light-emitting element; 1300: switching element; 1302: diode; 1304: capacitor; 1305: capacitor; 1306: resistor; 1308: resistor; 1309: coil; 1310: coil; 1311: resistor; 1312: constant current supply; 1314: control circuit; 1320: input terminal; 1330: Cuk DC-DC converter; 1340: light-emitting element; 2011: housing; 2012: display portion; 2013: operation key; 2014: external connection port; 2015: speaker; 2016: microphone; 2017: operation key; 2021: housing; 2022: housing; 2023: hinge; 2024: display portion; 2025: display portion; 2026: operation key; 2027: power switch; 2028: speaker; 2031: housing; 2032: display portion; 2033: lens; 2034: operation key; 2035: operation key; 2111: motor unit; 2112: battery; 2113: power conversion circuit; 2114: handle; 2115: wheel; 2116: saddle; 2121: motor unit; 2122: battery; 2123: power conversion circuit; 2124: control circuit; 3101: lighting portion; 3102: shade; 3103: adjustable arm; 3104: support; 3105: base; 3106: switch; 3201: lighting portion; 3202: support; 3203: supporting base; 3301: lighting device; 3302: lighting device; 3303: lighting device This application is based on Japanese Patent Application serial no. 2010-189490 filed with the Japan Patent Office on Aug. 26, 2010, and Japanese Patent Application serial no. 2011-087854 filed with the Japan Patent Office on Apr. 12, 2011, the entire contents of which are hereby incorporated by reference.

The invention claimed is:

1. A DC-DC converter comprising:
a power conversion portion including a switching element;
a first resistor, one of terminals of which is electrically connected to the power conversion portion;
a second resistor, one of terminals of which is electrically connected to the other of the terminals of the first resistor;
a third resistor, one of terminals of which is electrically connected to the other of the terminals of the first resistor;
a constant current supply electrically connected to the other of the terminals of the third resistor; and
a control circuit electrically connected to the other of the terminals of the third resistor and configured to control the switching element,
wherein a resistance $R_1$ of the first resistor, a resistance $R_2$ of the second resistor, a resistance $R_3$ of the third resistor, a reference current $I_{ref}$ output from the constant current supply, and an output voltage $V_{out}$ output from the power conversion portion satisfy a following formula:

$$\left\{\left(1 + \frac{R_3}{R_2}\right) \cdot R_1 + R_3\right\} \cdot I_{ref} > -V_{out}.$$

2. The DC-DC converter according to claim 1,
wherein the control circuit comprises a reference voltage generation circuit and a control signal generation portion.

3. The DC-DC converter according to claim 1,
wherein the other of the terminals of the second resistor is electrically connected to a terminal to which a reference potential is supplied.

4. The DC-DC converter according to claim 1,
wherein the power conversion portion comprises a coil, a capacitor, and a diode.

5. The DC-DC converter according to claim 1,
wherein the DC-DC converter is an inverting DC-DC converter.

6. The DC-DC converter according to claim 1,
wherein the DC-DC converter is a Cuk DC-DC converter.

7. A DC-DC converter comprising:
a power conversion portion including a switching element;
a first resistor, one of terminals of which is electrically connected to the power conversion portion;
a second resistor, one of terminals of which is electrically connected to the other of the terminals of the first resistor;

a third resistor, one of terminals of which is electrically connected to the other of the terminals of the first resistor; and a control circuit electrically connected to the other of the terminals, of the third resistor and configured to control the switching element, wherein the control circuit comprises a reference current generation circuit, and wherein a resistance $R_1$ of the first resistor, a resistance $R_2$ of the second resistor, a resistance $R_3$ of the third resistor, a reference current $I_{ref}$ generated by the reference current generation circuit, and an output voltage $V_{out}$ output from the power conversion portion satisfy a following formula:

$$\left\{\left(1+\frac{R_3}{R_2}\right)\cdot R_1 + R_3\right\}\cdot I_{ref} > -V_{out}.$$

8. The DC-DC converter according to claim 7, wherein the other of the terminals of the second resistor is electrically connected to a terminal to which a reference potential is supplied.

9. The DC-DC converter according to claim 7, wherein the power conversion portion comprises a coil, a capacitor, and a diode.

10. The DC-DC converter according to claim 7, wherein the DC-DC converter is an inverting DC-DC converter.

11. The DC-DC converter according to claim 7, wherein the DC-DC converter is a Cuk DC-DC converter.

12. A semiconductor device comprising:
a DC-DC converter, to which a positive voltage with respect to a reference potential is input and from which a negative voltage with respect to the reference potential is output, the DC-DC converter comprising:
 a power conversion portion including a switching element;
 a first resistor, one of terminals of which is electrically connected to the power conversion portion;
 a second resistor, one of terminals of which is electrically connected to the other of the terminals of the first resistor;
 a third resistor, one of terminals of which is electrically connected to the other of the terminals of the first resistor;
 a constant current supply electrically connected to the other of the terminals of the third resistor; and
 a control circuit electrically connected to the other of the terminals of the third resistor and configured to control the switching element,
 wherein a resistance $R_1$ of the first resistor, a resistance $R_2$ of the second resistor, a resistance $R_3$ of the third resistor, a reference current $I_{ref}$ output from the constant current supply, and an output voltage $V_{out}$ output from the power conversion portion satisfy a following formula:

$$\left\{\left(1+\frac{R_3}{R_2}\right)\cdot R_1 + R_3\right\}\cdot I_{ref} > -V_{out}.$$

13. The semiconductor device according to claim 12, wherein the other of the terminals of the second resistor is electrically connected to a terminal to which the reference potential is supplied.

14. The semiconductor device according to claim 12, wherein the DC-DC converter is an inverting DC-DC converter or a Cuk DC-DC converter.

15. An electronic device using the semiconductor device according to claim 12.

16. The electronic device according to claim 12, wherein the electronic device is a camera, a mobile phone, a personal digital assistant, an e-book terminal, a portable game machine, a digital photo frame, or an audio reproducing device.

17. A semiconductor device comprising:
a DC-DC converter, to which a positive voltage with respect to a reference potential is input and from which a negative voltage with respect to the reference potential is output, the DC-DC converter comprising:
 a power conversion portion including a switching element;
 a first resistor, one of terminals of which is electrically connected to the power conversion portion;
 a second resistor, one of terminals of which is electrically connected to the other of the terminals of the first resistor;
 a third resistor, one of terminals of which is electrically connected to the other of the terminals of the first resistor; and
 a control circuit electrically connected to the other of the terminals of the third resistor and configured to control the switching element,
 wherein the control circuit comprises a reference current generation circuit, and
 wherein a resistance $R_1$ of the first resistor, a resistance $R_2$ of the second resistor, a resistance $R_3$ of the third resistor, a reference current $I_{ref}$ generated by the reference current generation circuit, and an output voltage $V_{out}$ output from the power conversion portion satisfy a following formula:

$$\left\{\left(1+\frac{R_3}{R_2}\right)\cdot R_1 + R_3\right\}\cdot I_{ref} > -V_{out}.$$

18. The semiconductor device according to claim 17, wherein the other of the terminals of the second resistor is electrically connected to a terminal to which the reference potential is supplied.

19. The semiconductor device according to claim 17, wherein the DC-DC converter is an inverting DC-DC converter or a Cuk DC-DC converter.

20. An electronic device using the semiconductor device according to claim 17.

21. The electronic device according to claim 17, wherein the electronic device is a camera, a mobile phone, a personal digital assistant, an e-book terminal, a portable game machine, a digital photo frame, or an audio reproducing device.

* * * * *

UNITED STATES PATENT AND TRADEMARK OFFICE
CERTIFICATE OF CORRECTION

| | | |
|---|---|---|
| PATENT NO. | : 8,686,696 B2 | Page 1 of 1 |
| APPLICATION NO. | : 13/215315 | |
| DATED | : April 1, 2014 | |
| INVENTOR(S) | : Kazunori Watanabe | |

It is certified that error appears in the above-identified patent and that said Letters Patent is hereby corrected as shown below:

In the Specification

Column 5, line 56, before "using" replace "$V_{fb}$," with --$V_{out}$--;

Column 7, line 32, after "voltage $V_{ss}$" delete ",";

Column 8, line 39, after "$V_{ss}$" delete ",";

Column 11, line 23, before "and" replace "$V_{in}$," with --$V_{in}$--;

Column 13, line 6, replace "V" with --$V_{fb}$--;

Column 13, line 17, replace "V," with --$V_a$--;

Column 13, line 28, replace "$V_f$," with --$V_{fb}$--;

In the Claims

Column 15, line 5, in claim 7 after "terminals" delete ",".

Signed and Sealed this
Second Day of September, 2014

Michelle K. Lee
*Deputy Director of the United States Patent and Trademark Office*